(12) United States Patent
Ohmura et al.

(10) Patent No.: US 8,142,097 B2
(45) Date of Patent: Mar. 27, 2012

(54) BALL JOINT

(75) Inventors: Shuji Ohmura, Yokohama (JP); Shigeru Kuroda, Yokohama (JP); Masanao Ueda, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 486 days.

(21) Appl. No.: 10/235,428

(22) Filed: Sep. 9, 2002

(65) Prior Publication Data

US 2003/0049071 A1  Mar. 13, 2003

(30) Foreign Application Priority Data

Sep. 10, 2001 (JP) ................ 2001-273238

(51) Int. Cl.
*F16C 11/06* (2006.01)
(52) U.S. Cl. .......................... 403/90; 403/122
(58) Field of Classification Search ............. 403/56, 403/76, 90, 114, 115, 120, 122, 139
See application file for complete search history.

(56) References Cited

U.S. PATENT DOCUMENTS

| | | | | |
|---|---|---|---|---|
| 2,562,032 A * | 7/1951 | Gutensohn | .................... | 411/188 |
| 2,879,092 A * | 3/1959 | Grobel et al. | ................. | 403/337 |
| 3,726,108 A * | 4/1973 | Geislinger | ...................... | 464/24 |
| 4,103,725 A * | 8/1978 | Abe | .............. | 411/160 |
| 4,223,711 A * | 9/1980 | Tabor | ............. | 411/188 |
| 4,302,136 A * | 11/1981 | Abe et al. | ..................... | 411/158 |
| 4,779,326 A * | 10/1988 | Ichikawa | ...................... | 411/187 |
| 5,242,238 A | 9/1993 | Warner et al. | | |
| 5,356,253 A * | 10/1994 | Whitesell | ..................... | 411/188 |
| 5,683,196 A * | 11/1997 | Toyoda et al. | ................ | 403/120 |
| 6,116,108 A * | 9/2000 | Sturm | ............................. | 74/447 |
| 6,170,890 B1 * | 1/2001 | Ohmi et al. | ..................... | 285/379 |
| 6,343,904 B1 * | 2/2002 | Wang | ............................. | 411/188 |
| 6,361,259 B1 * | 3/2002 | Koeppel et al. | ................ | 411/188 |

FOREIGN PATENT DOCUMENTS

| | | |
|---|---|---|
| EP | 0 204 156 A1 | 12/1986 |
| GB | 597641 | 1/1948 |
| JP | 57-34894 | 3/1982 |
| JP | 63-045212 | 3/1988 |
| JP | 63135609 | 6/1988 |
| JP | 08-284948 | 11/1996 |
| JP | 08-319942 | 12/1996 |
| JP | 09-155668 | 6/1997 |
| JP | 11-324619 | 11/1999 |

OTHER PUBLICATIONS

English translation of JP1988135609.*
Japanese Official Letter dated Nov. 4, 2003 (2001-273238).

* cited by examiner

*Primary Examiner* — Victor MacArthur
(74) *Attorney, Agent, or Firm* — Arent Fox LLP

(57) ABSTRACT

A ball joint comprises a ball stud having a stud portion at a middle thereof, a ball portion and a screw portion at opposite sides of the stud portion, and a seat surface portion facing the screw portion between the respective portions, and a bearing member into which the ball portion is slidably fitted so as to universally pivotably-support the ball stud, so that the stud portion is inserted through a mounting member, and a nut is screwed with the screw portion projected from the mounting member, and the seat surface portion abuts and is fastened to the mounting member by fastening the nut to the mounting member. The seat surface portion abutting the mounting member is subjected to a co-rotation preventing process which prevents the ball stud from co-rotating along with the nut when the nut is fastened.

4 Claims, 4 Drawing Sheets

BALL JOINT

BACKGROUND OF THE INVENTION

1. Field of the Invention

The present invention relates to a ball joint used, for example, at a connection portion of a vehicle stabilizer.

2. Description of the Related Art

Thus type of ball joint is, as disclosed in Japanese Patent Application Laid-Open (JP-A) No. 8-284948, constructed so that a ball portion at one end portion of a ball stud is slidably fitted together with a ball seat and the ball stud is universally pivotably-supported. Furthermore, in order to fix it to a mounting member, the distal end side of the ball stud, at which a screw portion is formed, is passed through the mounting member, and a nut is screwed into the screw portion and fastened. The mounting member is thereby sandwiched by the seat surface portion formed at the ball stud and the nut, and is fastened.

When the nut is fastened and the ball stud is fixed to the mounting member, because the ball stud freely rotates with respect to the ball seat, if the rotation torque of the nut exceeds the frictional resistance of the seat surface portion for the mounting member, co-rotation in which the ball stud co-rotates along with the nut occurs, and fastening cannot be carried out. In a conventional art, a hexagonal head wrench is fitted with a hexagonal socket formed at the distal end surface of the ball stud, and due to the ball stud being regulated, fastening of the nut is possible. However, the fastening work is troublesome and this is unsatisfactory arises. Thus, in the above-described publication, it is proposed that a co-rotation preventing plate, whose area is greater than that of the seat surface, is sandwiched between the seat surface and the mounting member, and the co-rotation is prevented by increasing the frictional resistance with respect to the mounting member by the co-rotation preventing plate.

However, if the co-rotation preventing plate is used, an increase in the number of parts and the troublesomeness of assembly work in accordance therewith are brought about. Furthermore, it is supposed that there are cases in which, in accordance with the state of the degree of surface roughness of the abutting surfaces of the mounting member and the co-rotation preventing plate, the increase in frictional resistance is slight, and co-rotation cannot be reliably prevented.

SUMMARY OF THE INVENTION

Thus, an object of the present invention is to provide a ball joint which, without leading to an increase in the number of parts and the accompanying troublesomeness of assembly work, can reliably prevent co-rotation of a ball stud.

The present invention provides a ball joint comprising: a ball stud having a stud portion at a middle thereof, a ball portion and a screw portion at opposite sides of the stud portion, and a seat surface portion facing the screw portion between the respective portions; and a bearing member into which the ball portion is slidably fitted so as to universally pivotably-support the ball stud, so that the stud portion is inserted through a mounting member, and a nut is screwed with the screw portion projected from the mounting member, and the seat surface portion abuts and is fastened to the mounting member by fastening the nut to the mounting member. The seat surface portion abutting the mounting member is subjected to a co-rotation preventing process which prevents the ball stud from co-rotating along with the nut when the nut is fastened.

In accordance with the ball joint of the present invention, because a co-rotation preventing process is applied to the seat surface portion of the ball stud, the co-rotation preventing process works on the mounting member when the nut is fastened, and the ball stud is prevented from co-rotating along with the nut. Accordingly, without leading to an increase in the number of parts and the accompanying troublesomeness of assembly work, the co-rotation of a ball stud can be reliably prevented.

A specific example of the co-rotation preventing process relating to the present invention is the forming of projections biting into the mounting member in a fastened state. In this case, when the nut is fastened and the seat surface portion is fastened to the mounting member, the projections bite into the mounting member, and the co-rotation of the ball stud is prevented. The projections are preferably a sharp shape easily biting into the mounting member, and when painting is carried out on the mounting member, the co-rotation can be sufficiently prevented in a state in which the projections bite into the paint layer. With respect to the height of the projections, if it is too low, the co-rotation preventing effect is weak, and if it is too high, although co-rotation is prevented, looseness occurs. Therefore, a suitable height is required. For example, when a nut whose stipulated value of screw torque is 40 to 60 N·m is used, a height of the projection corresponding to this screw torque is suitably 0.03 to 0.12 mm.

Furthermore, another specific example of the co-rotation preventing process is a surface-roughening process increasing the frictional resistance with respect to the mounting member. The surface-roughening process is for increasing the degree of surface roughness, and with respect to the degree of surface roughness, for example, if co-rotation arises when the degree of surface roughness Ra is about 0.5 to 1.5, by carrying out a surface-roughening process such that Ra is 2.0 or more, the co-rotation can be prevented. As a method of a surface-roughening process, shot peening or the like may be suitably adopted.

DESCRIPTION OF THE PREFERRED EMBODIMENTS

Hereinafter, an embodiment of the present invention will be described with reference to FIG. 1 through FIGS. 4A and 4B.

Figure 1:
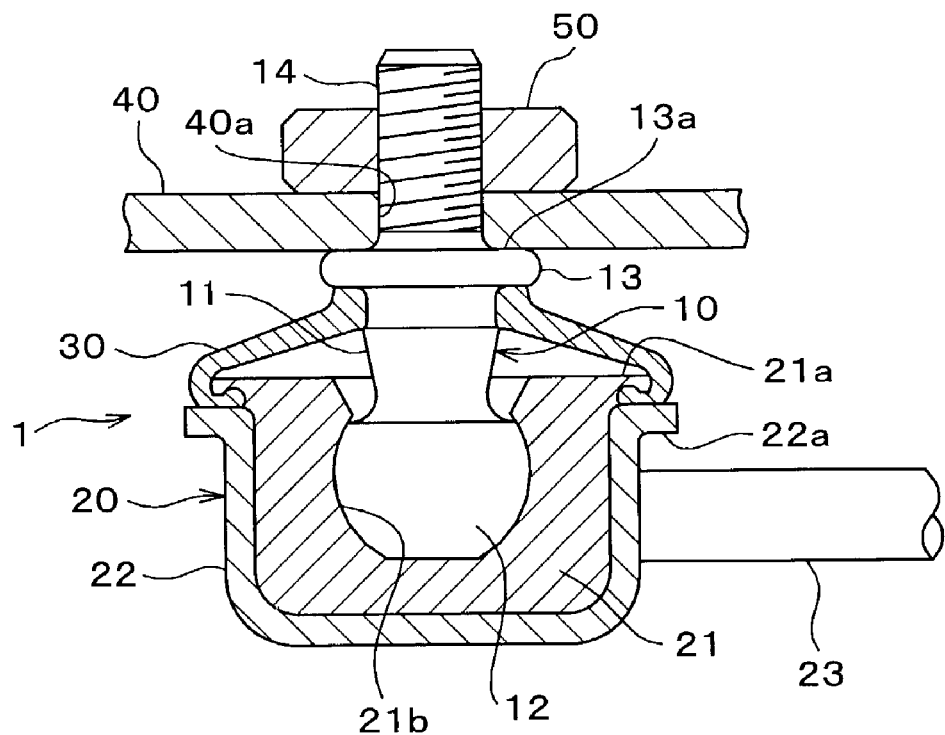
FIG. 1 is a longitudinal sectional view showing a ball joint relating to an embodiment of the present invention.

FIG. 1 shows a ball joint used for a connection portion of a vehicle stabilizer. A ball joint 1 relating to the embodiment is formed such that a ball stud 10 and a pivotably-supporting member 20 universally pivotably-supporting the ball stud 10 are a main body, and is fixed to a plate-shaped mounting member 40.

Figure 2:
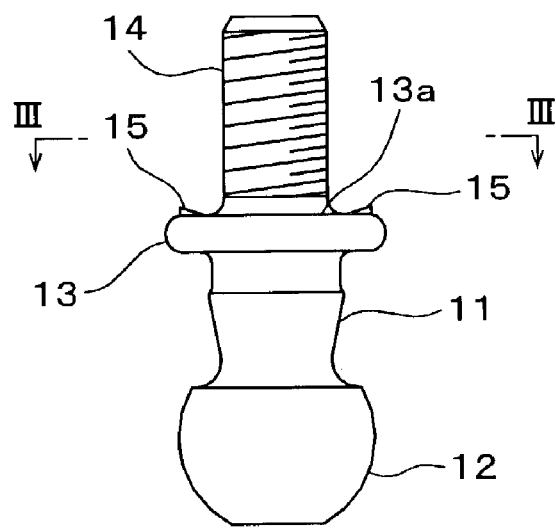
FIG. 2 is a side view of a ball stud structuring the ball joint relating to the embodiment of the present invention.

As shown in FIG. 2, at the ball stud 10, a ball portion 12 is formed at one end portion of a cylindrical stud portion 11, and a collar portion 13 is formed at intermediate portion in the axial direction of the stud portion 11, and furthermore, a screw portion 14 is formed at the distal end side from the collar portion 13 of the stud portion 11, that is, on the peripheral surface of the opposite side of the ball portion 12. The pivotably-supporting member 20 is structured from a ball seat 21 and a housing 22 in which the ball seat 21 is press-fit and accommodated. As shown in FIG. 1, the ball seat 21 is a cylindrical shape having a bottom and having a collar portion 21a at the upper end rim, and a spherical seat 21b is formed at the inside thereof. The ball seat 21 is molded from a hard resin such as polyacetal, polybutylene terephthalate, or the like. The housing 22 also is a of cylindrical shape having a bottom and having a collar portion 22a at the upper end rim. One end of a support bar 23 extending in the radial direction of the housing 22 is fixed to the outer peripheral wall of the housing 22.

As shown in FIG. 1, the ball portion 12 of the ball stud 10 is slidably fitted together with the spherical seat 21b of the ball seat 21. In this way, the ball stud 10 is pivotably-supported universally, that is, so as to freely rotate in an oscillating manner and so as to freely rotate axially, around the ball portion 12 with respect to the ball seat 21. Reference numeral 30 in FIG. 1 is an umbrella-shaped dust cover. The dust cover 30 is fixed by the end rim at the large diameter side thereof being sandwiched between the collar portion 21a of the ball seat 21 and the collar portion 22a of the housing 22, and the end rim at the small diameter side thereof is anchored to the collar portion 13 of the ball stud 10. The interior of the ball seat 21 is thereby covered.

As shown in FIG. 1, the ball joint 1 is fastened by sandwiching the mounting member 40 by the collar portion 13 of the ball stud 10 and a nut 50 by passing the distal end portion of the ball stud 10 on which the screw portion 14 is formed through a through hole 40a formed in the mounting member 40 and by screwing the nut 50 with the screw portion 14 so that the ball joint is fastened to the mounting member 40. In this fixed state, a ring-shaped seat surface portion 13a of the collar portion 13 facing the screw portion 14 abuts the mounting member 40. As shown in FIG. 2, a plurality of projections 15 preventing the ball stud 10 from co-rotating at the time of fastening the nut 50 are formed at the seat surface portion 13a.

Figure 3:
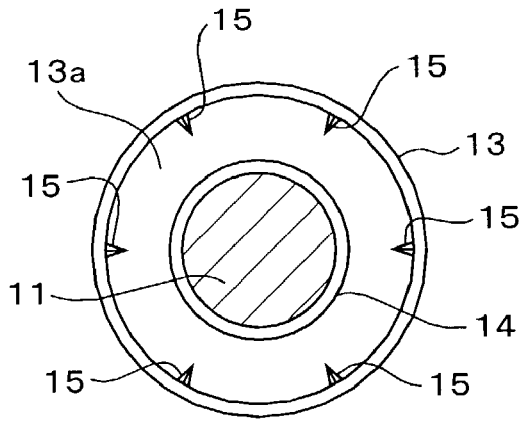
FIG. 3 is a sectional view taken along line III-III in FIG. 2.
Figure 4A:
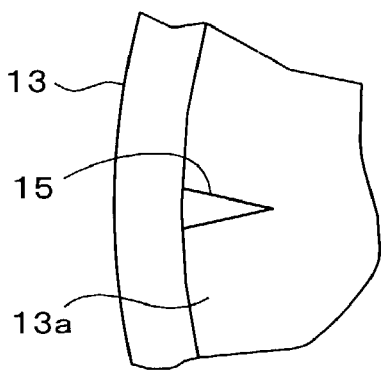
FIG. 4A is a plan view of one portion of a seat surface portion of a ball stud on which a projection relating to the embodiment of the present invention is formed.
Figure 4B:
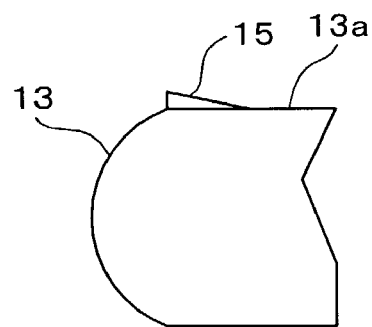
FIG. 4B is a side view of one portion of the seat surface portion thereof.

As shown in FIG. 3, the plurality of projections 15 (there are 6 projections in this case) are formed at uniform intervals along the outer peripheral rim of the seat surface portion 13a, and are arranged radially on the whole. As shown in FIGS. 4A and 4B, the projection 15 is a triangular pyramid shape whose plane view is a longitudinally elongated isosceles triangle shape and whose side view is a right-angled triangle shape. When the projection is made to be the tallest and is viewed in plan view, the short base portion is along the circumference of the seat surface portion 13a, and the distal end extends toward the axial center of the seat surface portion 13a. With respect to the dimensions of the projection 15, for example, when the screw portion 14 of the ball stud 10 is M10, the ball portion 12 has a diameter of 16 mm, and the outside diameter of the seat surface portion 13a is 16.5 mm, the height of the projection 15 is about 0.03 to 0.12 mm, and the length thereof is about 2 mm.

In accordance with the above described ball joint 1, as shown in FIG. 1, if the nut 50 is fastened in order to fix to the mounting member 40, the plurality of projections 15 formed at the seat surface portion 13a of the collar portion 13 of the ball stud 10 bite into the mounting member 40, and in accordance therewith, the co-rotation of the ball stud 10 is prevented. When paint is applied to the mounting member 40, the co-rotation is sufficiently prevented in a state in which the projections 15 bite into the paint layer. In the present embodiment, without using a new member to prevent co-rotation, prevention of co-rotation can be achieved by forming the projections 15 at the seat surface portion 13a of the collar portion 13. Accordingly, the co-rotation of the ball stud 10 can be reliably prevented without leading to an increase in the number of parts and the accompanying troublesomeness of assembly work.

Next, another embodiment of the present invention will be described with reference to FIG. 5.

Figure 5:
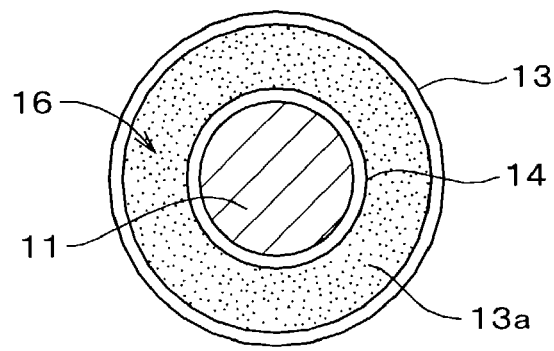
FIG. 5 is a transverse sectional view of a ball stud showing another embodiment of the present invention.

In the present embodiment, as shown in FIG. 5, instead of forming the above-described projections 15 at the seat surface portion 13a of the collar portion 13, a surface-roughening process 16 is applied to the seat surface portion 13a by a method such as shot peening or the like, and the degree of surface roughness is increased. In this way, if the seat surface portion 13a is subjected to a surface-roughening process, the frictional resistance of the seat surface portion 13a with respect to the mounting member 40 increases, and the co-rotation of the ball stud 10 at the time of fastening the nut 50 is prevented. It should be noted that, with respect to the degree of surface roughness of the seat surface portion 13a, for example, if co-rotation occurs when the degree of surface roughness Ra is about 0.5 to 1.5, co-rotation can be reliably prevented by surface-roughening processing so that the Ra is 2.0 or more.

EXAMPLES

Next, examples of the present invention will be described.
[1] Forming of projections
The projections of the shape and the arrangement shown in FIG. 3 and FIGS. 4A and 4B were formed, while changing the height in a range of 0.01 to 0.16 mm, at a seat surface portion of a collar portion of a ball stud which is the same as the ball stud 10 shown in FIG. 2 and whose material was steel equivalent to S30C to S45C. The projections were formed by forging at the same time as the molding of the ball stud. As shown in FIG. 1, these ball studs were fastened to a mounting member by nuts, and the screw torque when co-rotation arose at the ball stud was investigated. It should be noted that the screw portion with which the nut was screwed was M10, and an electrophoretic coating of a cationic resin was applied at a thickness of 20±10 μm to the surface of the mounting member into which the projections bit.

Figure 6:
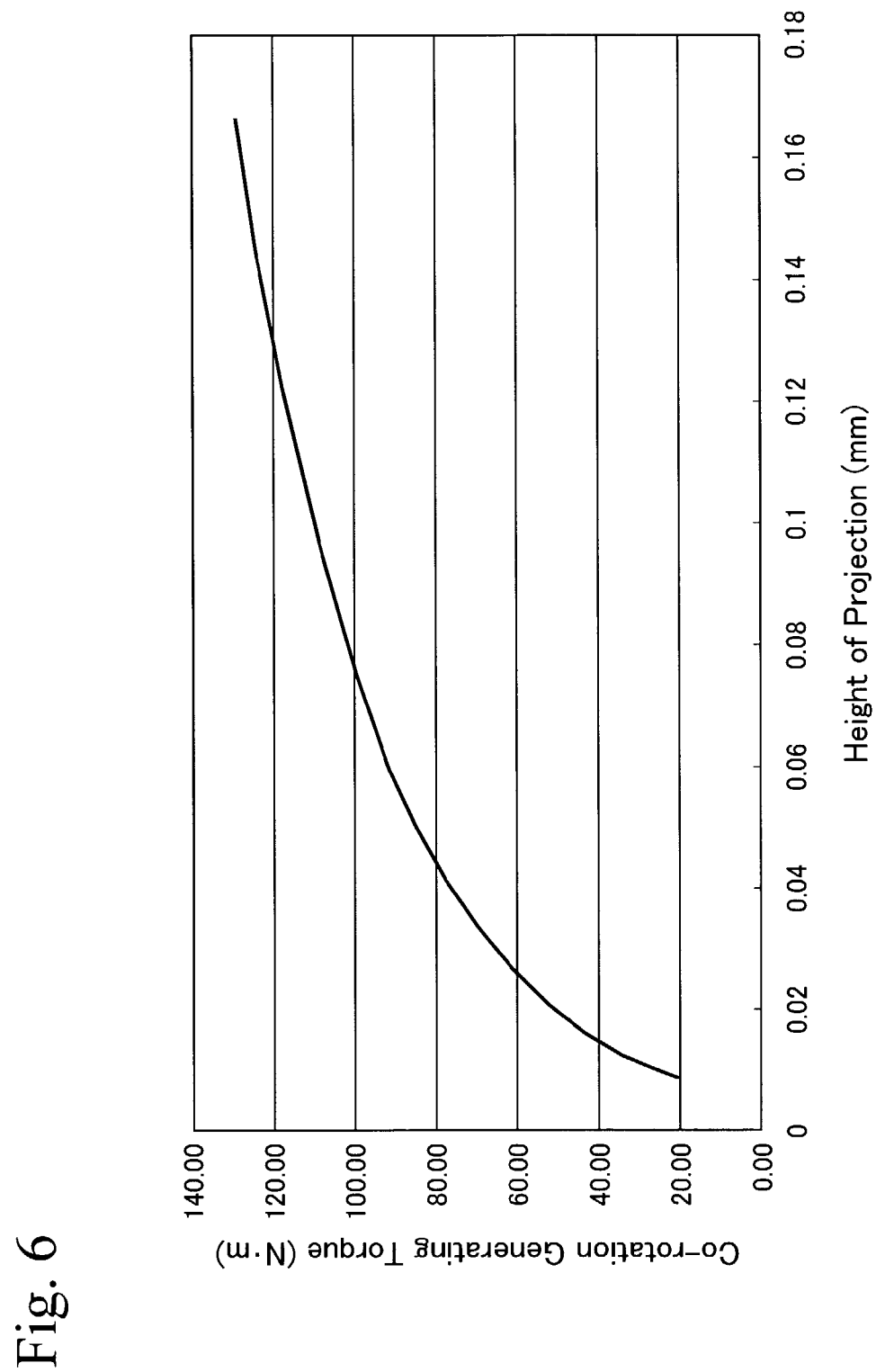
FIG. 6 is a graph showing the relationship between the height of the projection and a co-rotation generated torque relating to the embodiment of the present invention.

FIG. 6 shows the relationship between the height of the projection and co-rotation generating torque. A specified value of the screw torque of an M10 screw portion is 40 to 60 N·m, and it is known that it suffices to ensure about 0.03 mm as the height of the projection at which co-rotation does not arise even if the specified value of the screw torque is 60 N·m which is the upper limit. Furthermore, for safety, even if the screw torque is two times 60 N·m, that is, 120 N·m, the height of the projection at which co-rotation does not arise is about 0.12 mm. However, because there is a concern that if the height of the project is greater than that, the nut will loosen, the height of the projection in this case is appropriately 0.03 to 0.12 mm.
[2] Surface-roughening process
Instead of forming the projections, the seat surface portion of a collar portion of a steel ball stud (the screw portion was M12), which was the same as the ball stud 10 shown in FIG. 2, was subjected to surface-roughening processing while varying the degree of surface roughness Ra in a range from about 0 to 5.0. These ball studs were fastened to the mounting member by nuts in the same way as described above, and the screw torque when co-rotation arose at the ball stud was investigated.

Figure 7:
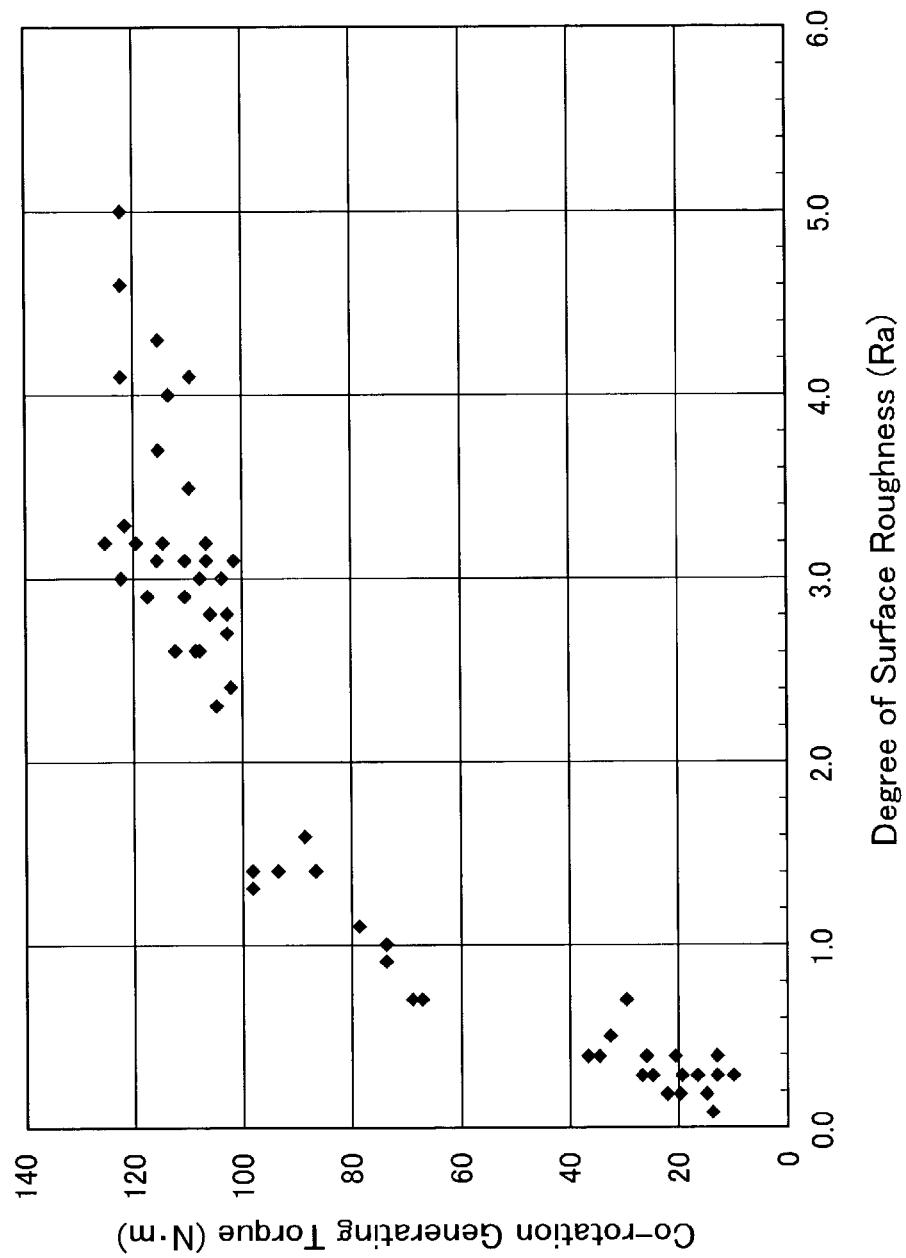
FIG. 7 is a graph showing the relationship of a degree of surface roughness and a co-rotation generated torque relating to the embodiment of the present invention.

FIG. 7 shows the relationship between the degree of surface roughness and co-rotation generating torque. The specified value of the screw torque of the screw portion of M12 is 80 to 100 N·m. It can be understood that, as a degree of surface roughness at which co-rotation does not arise in accordance therewith, it suffices to ensure an Ra of 2.0 or more.

What is claimed is:

1. A ball joint comprising:

a ball stud having a stud portion at a middle thereof, a ball portion and a screw portion at opposite sides of the stud portion, a collar portion formed between the stud portion and the screw portion and having a larger diameter than that of the screw portion, wherein the stud portion, the ball portion, the screw portion, and the collar portion are formed integrally so as to form one piece of homogeneous construction, and a seat surface portion formed on a surface of the collar portion facing the screw portion; and a bearing member into which the ball portion is slidably fitted so as to universally pivotably-support the ball stud, wherein the stud portion is inserted through a mounting member, and a nut is screwed with the screw portion projected from the mounting member, and the seat surface portion directly abuts and is fastened to the mounting member by fastening the nut to the mounting member, the seat surface portion abutting the mounting member is directly formed with projections which prevents co-rotation of the ball stud when the nut is fastened and loosed, the projections have a height in a range of from 0.03 to 0.12 mm, thereby biting into the mounting member by an axial force caused by fastening the nut to the mounting member, and the screw portion has a stipulated value of screw torque in a range of from 40 to 60 N·m, wherein the projections are arranged along a circumference of the seat surface portion, and have a shape of trigonal pyramid in which a sharpened end thereof extends toward a center of the seat surface portion in plan view and side view.

2. The ball joint according to claim 1, wherein the bearing member comprises a single aperture therein, the ball stud being slidably fitted into said single aperture.

3. A ball joint comprising:

a ball stud having a stud portion at a middle thereof, a ball portion and a screw portion at opposite sides of the stud portion, a collar portion formed between the stud portion and the screw portion and having a larger diameter than that of the screw portion, wherein the stud portion, the ball portion, the screw portion, and the collar portion are formed integrally so as to form one piece of homogeneous construction, and a seat surface portion formed on a surface of the collar portion facing the screw portion; and a bearing member into which the ball portion is slidably fitted so as to universally pivotably-support the ball stud, wherein the stud portion is inserted through a mounting member, and a nut is screwed with the screw portion projected from the mounting member and the seat surface portion directly abuts and is fastened to the mounting member by fastening the nut to the mounting member, the seat surface portion abutting the mounting member is directly formed with a rugged portion of which projections bite into the mounting member and prevent co-rotation of the ball stud when the nut is fastened and loosed, the rugged portion is formed by shot peening and has a surface roughness in a range of from Ra 3.0 to Ra 5.0 or more, and the screw portion has a stipulated value of screw torque in a range of from 80 to 100 N·m.

4. The ball joint according to claim 3, wherein the rugged portion is a rugged shot-peened surface.

* * * * *